United States Patent
You

(10) Patent No.: US 12,309,728 B2
(45) Date of Patent: May 20, 2025

(54) METHODS FOR SENDING AND RECEIVING SOUNDING REFERENCE SIGNAL, TERMINAL DEVICE AND NETWORK DEVICE

(71) Applicant: GUANGDONG OPPO MOBILE TELECOMMUNICATIONS CORP., LTD., Dongguan (CN)

(72) Inventor: Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 217 days.

(21) Appl. No.: 18/081,097

(22) Filed: Dec. 14, 2022

(65) Prior Publication Data
US 2023/0108216 A1  Apr. 6, 2023

Related U.S. Application Data

(63) Continuation of application No. PCT/CN2020/102692, filed on Jul. 17, 2020.

(51) Int. Cl.
| | | |
|---|---|---|
| H04W 56/00 | (2009.01) | |
| H04L 5/00 | (2006.01) | |
| H04W 74/0833 | (2024.01) | |
| H04W 76/30 | (2018.01) | |

(52) U.S. Cl.
CPC ....... *H04W 56/0045* (2013.01); *H04L 5/0051* (2013.01); *H04W 74/0841* (2013.01); *H04W 76/30* (2018.02)

(58) Field of Classification Search
None
See application file for complete search history.

(56) References Cited

U.S. PATENT DOCUMENTS
2015/0124787 A1    5/2015  Dinan

FOREIGN PATENT DOCUMENTS
| CN | 104968044 A | | 10/2015 | |
|---|---|---|---|---|
| CN | 110547002 A | * | 12/2019 | ....... H04L 27/26025 |
| CN | 110896560 A | * | 3/2020 | ........ H04W 56/0005 |
| CN | 111093261 A | | 5/2020 | |

OTHER PUBLICATIONS

International Search Report and Written Opinion dated Mar. 30, 2021 in International Application No. PCT/CN2020/102692. English translation attached.

(Continued)

*Primary Examiner* — Peter Chen
(74) *Attorney, Agent, or Firm* — Sheppard, Mullin, Richter & Hampton LLP

(57) ABSTRACT

Embodiments of the present disclosure provide a wireless communication method, a terminal device, and a network device, enabling the terminal device to achieve uplink synchronization in an idle state or an inactive state, thereby allowing SRS transmission. The wireless communication method includes: determining, by the terminal device, a first Timing Advance (TA); and transmitting, by the terminal device, a Sounding Reference Signal (SRS) according to the first TA. The terminal device is in an idle state, or the terminal device is in an inactive state.

14 Claims, 3 Drawing Sheets

(56) References Cited

OTHER PUBLICATIONS

3rd Generation Partnership Project; Technical Specification Group Radio Access Network; NR; Radio Resource Control (RRC) protocol specification(Release 16), 3GPP TS 38.331 V16.0.0, Mar. 2020 (Mar. 2020) , section 6.3.2.
Extended European Search Report dated Jun. 12, 2023 received in European Patent Application No. EP20945188.9.
Communication pursuant to Article 94(3) EPC for European application 20945188.9 mailed Jan. 4, 2024.

* cited by examiner

METHODS FOR SENDING AND RECEIVING SOUNDING REFERENCE SIGNAL, TERMINAL DEVICE AND NETWORK DEVICE

CROSS-REFERENCE TO RELATED APPLICATIONS

This application is a continuation of International Application No. PCT/CN2020/102692 filed on Jul. 17, 2020, the entire disclosure of which is incorporated herein by reference.

TECHNICAL FIELD

The embodiments of the present disclosure relate to communication technology, and more particularly, to a wireless communication method, a terminal device and a network device.

BACKGROUND

In a New Radio (NR) system, a Sounding Reference Signal (SRS) is configured and transmitted while a terminal device in a connected state. However, in some scenarios, the terminal device needs to transmit an SRS in an idle state or an inactive state. How to transmit an SRS in the idle state or the inactive state is an urgent problem to be solved.

SUMMARY

Embodiments of the present disclosure provide a wireless communication method, a terminal device, and a network device, enabling the terminal device to achieve uplink synchronization in an idle state or an inactive state, thereby allowing SRS transmission.

In a first aspect, a wireless communication method is provided. The method includes: determining, by a terminal device, a first Timing Advance (TA); and transmitting, by the terminal device, a Sounding Reference Signal (SRS) according to the first TA. The terminal device is in an idle state, or the terminal device is in an inactive state.

In a second aspect, a wireless communication method is provided. The method includes: receiving, by a network device, a Sounding Reference Signal (SRS) transmitted by a terminal device according to a first Timing Advance (TA). The terminal device is in an idle state, or the terminal device is in an inactive state.

In a third aspect, a terminal device is provided. The terminal device is configured to perform the method according to the above first aspect.

In particular, the terminal device includes one or more functional modules configured to perform the method according to the above first aspect.

In a fourth aspect, a network device is provided. The network device is configured to perform the method according to the above second aspect.

In particular, the network device includes one or more functional modules configured to perform the method according to the above second aspect.

In a fifth aspect, a terminal device is provided. The terminal device includes a processor and a memory. The memory has a computer program stored thereon, and the processor is configured to invoke and execute the computer program stored in the memory to perform the method according to the above first aspect.

In a sixth aspect, a network device is provided. The network device includes a processor and a memory. The memory has a computer program stored thereon, and the processor is configured to invoke and execute the computer program stored in the memory to perform the method according to the above second aspect.

In a seventh aspect, an apparatus is provided. The apparatus is configured to perform the method according to any of the above first and second aspects.

In particular, the apparatus includes a processor configured to invoke and execute a computer program from a memory, to cause a device provided with the apparatus to perform the method according to any of the above first and second aspects.

In an eighth aspect, a computer-readable storage medium is provided. The computer-readable storage medium stores a computer program that causes a computer to perform the method according to any of the above first and second aspects.

In a ninth aspect, a computer program product is provided. The computer program product includes computer program instructions that cause a computer to perform the method according to any of the above first and second aspects.

In a tenth aspect, a computer program is provided. The computer program, when executed on a computer, causes the computer to perform the method according to any of the above first and second aspects.

With the above technical solutions, the terminal device can transmit the SRS according to the first TA in the idle state or the inactive state. That is, the terminal device can achieve uplink synchronization based on the first TA in the idle state or the inactive state, thereby ensuring that the terminal device can transmit the SRS in the idle state or the inactive state.

DETAILED DESCRIPTION

Figure 1:
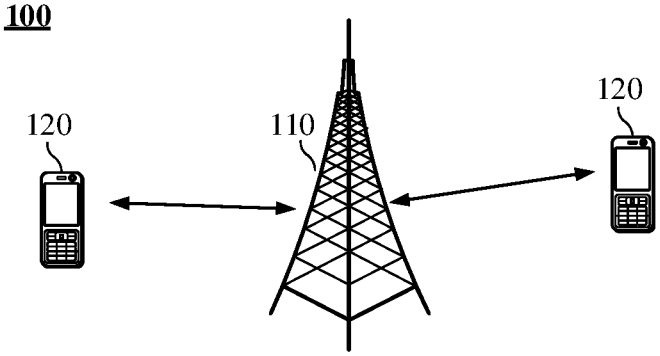
FIG. 1 is a schematic diagram showing a communication system architecture according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

It should be understood that location is one of the essential applications in current lives, and at the same time, the requirements on delay and accuracy of positioning are becoming more and more strict. In many positioning applications, accurate positioning is typically achieved with a combination of technologies such as 1) Global Navigation Satellite System (GNSS) providing location information in outdoor scenarios; 2) radio technologies (such as LTE network, with multiple options for locating users, wireless networks, terrestrial beacon systems, etc.); 3) Inertial Measurement Units (IMUs) or sensors (e.g., for tracking user locations based on accelerometers, gyroscopes, magnetic instrument or vertical positioning using barometric pressure sensors). These technologies are expected to play an important role in enabling accurate user positioning in the future.

The 3rd Generation Partnership Project (3GPP) NR's enhanced positioning capabilities bring additional gains. The operations at low and high frequency bands (i.e., FR1 and FR2) and the use of a large number of antenna arrays provide additional degrees of freedom, which greatly improves positioning accuracy. Positioning technologies based on Observed Time Difference of Arrival (OTDOA), Uplink Time Difference of Arrival (UTDOA), Cell-ID or Enhanced Cell-ID (E-Cell-ID) utilize large bandwidth (low and high frequency bands) for time measurement, so as to bring better performance for user positioning. Utilizing massive antenna systems, such as massive Multiple-Input Multiple-Output (massive MIMO) systems, enables more accurate user positioning by combining time measurements with spatial and angular domains of propagation channels.

Sounding Reference Signal (SRS) is one of the main reference signals used for positioning. Based on the SRS transmitted by a terminal device, a network device can measure a time of arrival, a signal strength, and an inclination of arrival to determine the location information of the terminal device. In addition, the Sounding Reference Signal (SRS) is also one of the main reference signals for uplink measurement, and the terminal device can perform uplink beam management based on the SRS, thereby determining the analog beam used for uplink transmission.

The activation and deactivation of the SRS can be implemented based on Media Access Control Control Element (MAC CE) signaling. The MAC CE signaling is used to activate/deactivate the SRS for positioning and its corresponding spatial relation.

It should be noted that, at the current stage, the SRS is configured and transmitted by the terminal device in the connected state, since in the connected state the terminal device is synchronized with the network side. Then, when the terminal device enters the idle (IDLE) state or the inactive (inactive) state, since it is not synchronized with the network, it cannot receive a configuration from the network side and transmit the SRS.

Based on the above problems, the present disclosure provides a solution for transmitting an SRS, and a terminal device can transmit the SRS according to a first TA in an idle state or an inactive state. That is, the terminal device can achieve uplink synchronization based on the first TA in the idle state or the inactive state, thereby ensuring that the terminal device can transmit the SRS in the idle state or the inactive state.

The technical solutions of the present disclosure will be described in detail below with reference to specific embodiments.

Figure 2:
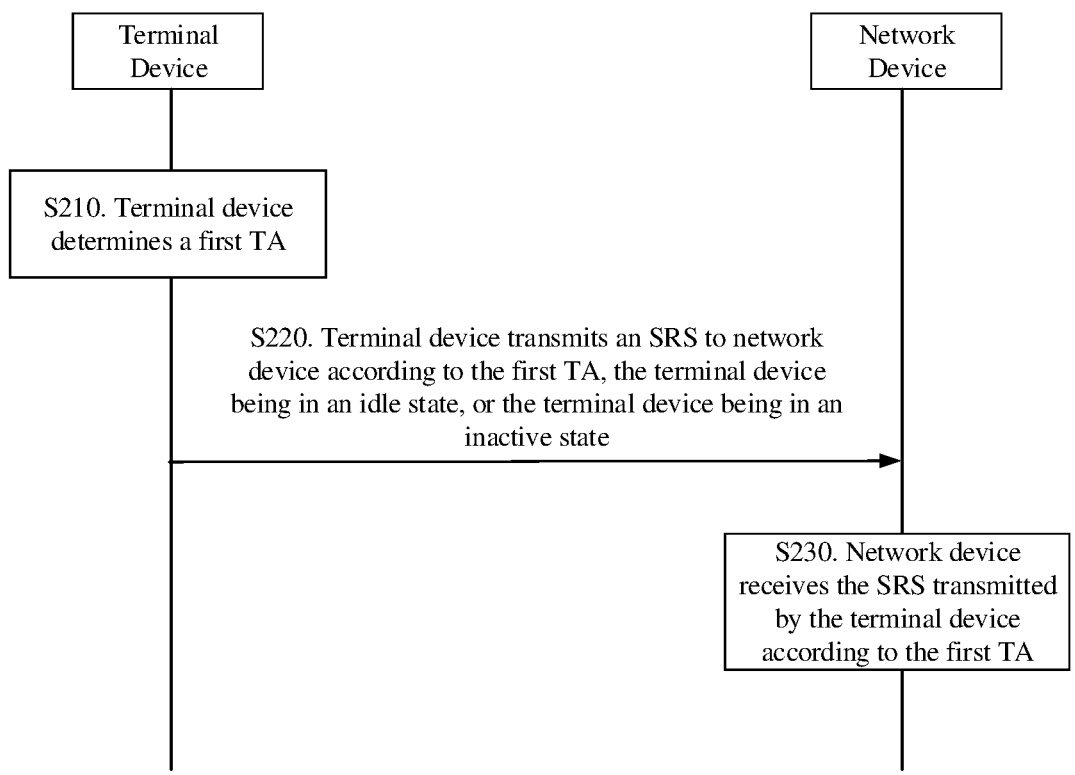
FIG. 2 is a schematic flowchart illustrating a wireless communication method according to an embodiment of the present disclosure.

FIG. 2 is a schematic flowchart illustrating a wireless communication method 200 according to an embodiment of the present disclosure. As shown in FIG. 2, the method 200 may include at least part of the following contents.

At S210, a terminal device determines a first TA.

At S220, the terminal device transmits a Sounding Reference Signal (SRS) to a network device according to the first TA. The terminal device is in an idle state, or the terminal device is in an inactive state.

At S230, a network device receives the SRS transmitted by the terminal device according to the first TA.

In the embodiment of the present disclosure, the terminal device in the idle state or the inactive state can achieve uplink synchronization based on the first TA, thereby ensuring that the terminal device can transmit the SRS in the idle state or the inactive state.

It should be noted that, in some scenarios, the terminal device may transmit the SRS in the idle state or the inactive state, that is, the terminal device does not need to transmit the SRS after entering the connected state, thereby achieving energy saving of the terminal.

Optionally, in an embodiment of the present disclosure, the SRS may include at least one of:

an SRS for uplink measurement or an SRS for positioning.

Optionally, in an embodiment of the present disclosure, the first TA may represent a timing advance between the terminal device and the network device. Alternatively, the first TA may represent a timing advance between a reference point in a cell where the terminal device resides and a base station. Alternatively, the first TA may represent a timing advance between the reference point in the cell where the terminal device resides and the network device. Alternatively, the first TA may represent a timing advance between the reference point in the cell where the terminal device resides and an access network device.

Optionally, the reference point may be located at an edge of the cell where the terminal device resides, or the reference point may be located at a center of the cell where the terminal device resides, or the reference point may be a location of the terminal device in the cell where the terminal device resides, or the reference point may be a location preconfigured or agreed in a protocol in the cell where the terminal device resides.

It should be noted that, in some cases, the cell where the terminal device resides can also be understood as a cell where the terminal device is currently located, or the cell where the terminal device resides can also be understood as a serving cell before the terminal device enters the idle state/inactive state.

Optionally, in an embodiment of the present disclosure, the first TA may be obtained using the following two schemes in Example 1 and Example 2.

In Example 1, the terminal device determines the first TA based on a second TA and/or a TA timer.

The second TA is a TA before the terminal device leaves a connected state, a TA broadcasted by a network device after the terminal device enters the idle state or the inactive state, or a TA obtained in a random access procedure.

It should be noted that, if the second TA is the TA before the terminal device leaves the connected state, in this case, the second TA may be a last TA obtained before the terminal device leaves the connected state.

In addition, if the second TA is the TA obtained in the random access procedure, in this case, the second TA may, for example, be carried in the second item of information (message 2, or Msg 2) or in the fourth item of information (message 4, or Msg 4) in the four-step random access procedure. Alternatively, for example, the second TA may be carried in the second item of information (message B, or Msg B) in the two-step random access procedure. Alternatively, for example, the second TA may be carried in the information transmitted by the network device after the random access succeeds. Further, the second TA may be a TA adjusted and obtained based on a TA command Media Access Control Control Element (MAC CE) transmitted by the network after the random access of the terminal device succeeds.

Optionally, in Example 1, the terminal device may determine the first TA based on the second TA. For example, after obtaining the second TA, the terminal device may directly determine the second TA as the first TA. In another example, after obtaining the second TA, the terminal device may determine a sum of the second TA and a TA offset as the first TA, where the TA offset may be pre-configured or agreed in a protocol, or the TA offset may be configured by the network device by means of broadcast.

Optionally, in Example 1, the terminal device may determine the first TA based on the second TA and the TA timer. For example, while the TA timer is running, the terminal device may determine the second TA as the first TA. That is, while the TA timer is running, the second TA is the first TA. When the TA timer expires, the second TA becomes invalid, and at this time, the terminal device cannot determine the first TA, and cannot transmit the SRS according to the first TA.

Optionally, the TA timer may have one or more starting or restarting conditions including at least one of:
  the terminal device entering the idle state or the inactive state;
  the terminal device receiving configuration information of the TA timer;
  the terminal device receiving instruction information for updating a configuration of the TA timer; or
  the terminal device receiving a TA or TA adjustment value transmitted by the network device.

Optionally, the TA timer may have one or more stopping conditions including at least one of:
  the terminal device entering a connected state;
  the terminal device initiating a random access procedure;
  the terminal device moving from a current cell to another cell;
  the terminal device moving from a current tracking area to another tracking area;
  the terminal device moving from a coverage of a current Radio Access Network (RAN) to a coverage of another RAN; or
  the terminal device moving from a current SRS valid area to another SRS valid area.

It should be noted that "current" can be understood as the time or moment at which the terminal device determines the first TA.

Optionally, in Example 1, the terminal device may receive configuration information for configuring the TA timer.

For example, the terminal device may receive the configuration information transmitted by the network device when the terminal device is in a connected state.

Optionally, the configuration information may be carried in Radio Resource Control (RRC) reconfiguration information or RRC release information.

Optionally, the configuration information may be carried in system information. That is, the terminal device may receive the configuration information in the idle state or the inactive state, and in this case, the configuration information may further include the second TA.

Optionally, in Example 1, when the TA timer expires, the terminal device may initiate a random access procedure, and/or the terminal device may stop transmission of the SRS.

It should be noted that, when the TA timer expires, the terminal device may initiate the random access procedure for one or more of the following purposes:
  for entering the connected state and transmitting the SRS in the connected state;
  for obtaining the first TA in the random access procedure, and continuing to transmit the SRS based on the first TA; or
  for re-obtaining the configuration information for configuring the TA timer.

In Example 2, the terminal device may receive a system broadcast message indicating the first TA; and the terminal device may determine the first TA based on the system broadcast message.

Optionally, the system broadcast message is a periodic broadcast message. That is, the network device may periodically broadcast the first TA. For example, the network device may determine the location and/or movement trajectory of the terminal device based on the received SRS, and periodically update the first TA based on the determined location and/or movement trajectory.

Optionally, in some embodiments, after the terminal device leaves a TA valid area, the terminal device may re-initiate a random access procedure, and the terminal device may update the first TA in the random access procedure.

Correspondingly, the network device may update the first TA in the random access procedure re-initiated after the terminal device leaves the TA valid area.

Optionally, the TA valid area may include at least one of: a cell coverage, a coverage of an RAN, a tracking area, or a particular area in an SRS valid area.

Optionally, when the TA valid area is the cell coverage, the terminal device may determine whether it has left the cell coverage based on a Physical Cell Identifier (PCI) in a system message.

For example, when the TA valid area is the cell coverage, the terminal device may determine whether it has left the cell coverage based on whether the PCI in the system message has changed.

Therefore, in the embodiment of the present disclosure, the terminal device can transmit the SRS according to the first TA in the idle state or the inactive state. That is, the terminal device can achieve uplink synchronization based on the first TA in the idle state or the inactive state, thereby ensuring that the terminal device can transmit the SRS in the idle state or the inactive state.

The method embodiments of the present disclosure have been described in detail above with reference to FIG. 2, and the apparatus embodiments of the present disclosure will be described in detail below with reference to FIG. 3 to FIG. 7. It should be understood that the apparatus embodiments and the method embodiments correspond to each other, and for similar descriptions, reference can be made to the method embodiments.

Figure 3:
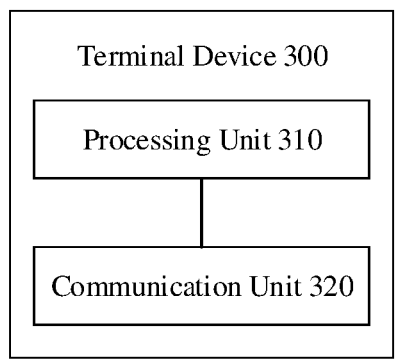
FIG. 3 is a schematic block diagram of a terminal device according to an embodiment of the present disclosure.

FIG. 3 shows a schematic block diagram of a terminal device 300 according to an embodiment of the present disclosure. As shown in FIG. 3, the terminal device 300 includes:

a processing unit 310 configured to determine a first Timing Advance (TA); and
a communication unit 320 configured to transmit a Sounding Reference Signal (SRS) according to the first TA.

The terminal device is in an idle state, or the terminal device is in an inactive state.

Optionally, the processing unit 310 may be configured to:
determine the first TA based on a second TA and/or a TA timer, The second TA is a TA before the terminal device leaves a connected state, a TA broadcasted by a network device after the terminal device enters the idle state or the inactive state, or a TA obtained in a random access procedure.

Optionally, the processing unit 310 may be configured to:
determine the second TA as the first TA while the TA timer is running.

Optionally, the TA timer may have one or more starting or restarting conditions including at least one of:
the terminal device entering the idle state or the inactive state;
the terminal device receiving configuration information of the TA timer;
the terminal device receiving instruction information for updating a configuration of the TA timer; or
the terminal device receiving a TA or TA adjustment value transmitted by the network device.

Optionally, the TA timer may have one or more stopping conditions including at least one of:
the terminal device entering a connected state;
the terminal device initiating a random access procedure;
the terminal device moving from a current cell to another cell;
the terminal device moving from a current tracking area to another tracking area;
the terminal device moving from a coverage of a current Radio Access Network (RAN) to a coverage of another RAN; or
the terminal device moving from a current SRS valid area to another SRS valid area.

Optionally, the communication unit 320 may be further configured to receive configuration information for configuring the TA timer.

Optionally, the communication unit 320 may be configured to:
receive the configuration information when the terminal device is in a connected state.

Optionally, the configuration information may be carried in Radio Resource Control (RRC) reconfiguration information or RRC release information.

Optionally, the communication unit 320 may be further configured to initiate a random access procedure, and/or stop transmission of the SRS, when the TA timer expires.

Optionally, the communication unit 320 may be further configured to receive a system broadcast message indicating the first TA, and the processing unit 310 may be further configured to determine the first TA based on the system broadcast message.

Optionally, the system broadcast message may be a periodic broadcast message.

Optionally, the communication unit 320 may be further configured to re-initiate a random access procedure after the terminal device leaves a TA valid area, the terminal device updating the first TA in the random access procedure.

Optionally, the TA valid area may include at least one of: a cell coverage, a coverage of an RAN, a tracking area, or a particular area in an SRS valid area.

Optionally, the processing unit 310 may be further configured to determine, when the TA valid area is the cell coverage, whether the terminal device has left the cell coverage based on a Physical Cell Identifier (PCI) in a system message.

Optionally, the first TA may represent a timing advance between a reference point in a cell where the terminal device resides and a base station, or the first TA may represent a timing advance between the terminal device and the network device.

Optionally, the reference point may be located at an edge of the cell where the terminal device resides, or the reference point may be located at a center of the cell where the terminal device resides, or the reference point may be a location of the terminal device in the cell where the terminal device resides, or the reference point may be a location preconfigured or agreed in a protocol in the cell where the terminal device resides.

Optionally, the SRS may include at least one of: an SRS for uplink measurement or an SRS for positioning.

Optionally, in some embodiments, the above communication unit may be a communication interface or a transceiver, or an input/output interface of a communication chip or a system-on-chip. The above processing unit may be one or more processors.

It should be understood that the terminal device 300 according to the embodiment of the present disclosure may correspond to the terminal device in the method embodiment of the present disclosure, and the above and other operations and/or functions of the respective units in the terminal device 300 are provided for the purpose of implementing the process flow corresponding to the terminal device in the method 200 shown in FIG. 2, and details thereof will be not omitted here for brevity.

Figure 4:
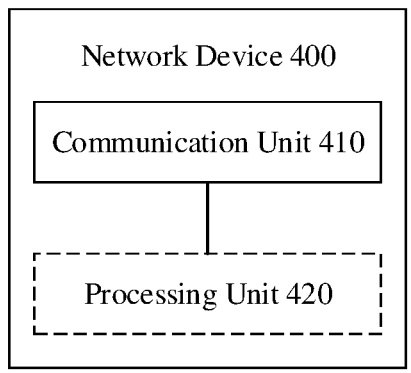
FIG. 4 is a schematic block diagram of a network device according to an embodiment of the present disclosure.

FIG. 4 shows a schematic block diagram of a network device 400 according to an embodiment of the present disclosure. As shown in FIG. 4, the network device 400 includes:

a communication unit 410 configured to receive a Sounding Reference Signal (SRS) transmitted by a terminal device according to a first Timing Advance (TA).

The terminal device is in an idle state, or the terminal device is in an inactive state.

Optionally, the first TA may be determined based on a second TA and/or a TA timer.

The second TA may be a TA before the terminal device leaves a connected state, a TA broadcasted by the network device after the terminal device enters the idle state or the inactive state, or a TA obtained in a random access procedure.

Optionally, the second TA may be the first TA while the TA timer is running.

Optionally, the TA timer may have one or more starting or restarting conditions including at least one of:

the terminal device entering the idle state or the inactive state;

the terminal device receiving configuration information of the TA timer;

the terminal device receiving instruction information for updating a configuration of the TA timer; or the terminal device receiving a TA or TA adjustment value transmitted by the network device.

Optionally, the TA timer may have one or more stopping conditions including at least one of:

the terminal device entering a connected state;

the terminal device initiating a random access procedure;

the terminal device moving from a current cell to another cell;

the terminal device moving from a current tracking area to another tracking area;

the terminal device moving from a coverage of a current Radio Access Network (RAN) to a coverage of another RAN; or the terminal device moving from a current SRS valid area to another SRS valid area.

Optionally, the communication unit 410 may be further configured to transmit configuration information to the terminal device for configuring the TA timer.

Optionally, the communication unit 410 may be configured to:

transmit the configuration information to the terminal device when the terminal device is in a connected state.

Optionally, the configuration information may be carried in Radio Resource Control (RRC) reconfiguration information or RRC release information.

Optionally, the communication unit 410 may be further configured to transmit a system broadcast message indicating the first TA.

Optionally, the system broadcast message may be a periodic broadcast message.

Optionally, the network device 400 may further include:

a processing unit 420 configured to update the first TA in a random access procedure re-initiated after the terminal device leaves the TA valid area.

Optionally, the TA valid area may include at least one of: a cell coverage, a coverage of an RAN, a tracking area, or a particular area in an SRS valid area.

Optionally, the first TA may represent a timing advance between a reference point in a cell where the terminal device resides and a base station, or the first TA may represent a timing advance between the terminal device and the network device.

Optionally, the reference point may be located at an edge of the cell where the terminal device resides, or the reference point may be located at a center of the cell where the terminal device resides, or the reference point may be a location of the terminal device in the cell where the terminal device resides, or the reference point may be a location preconfigured or agreed in a protocol in the cell where the terminal device resides.

Optionally, the SRS may include at least one of: an SRS for uplink measurement or an SRS for positioning.

Optionally, in some embodiments, the above communication unit may be a communication interface or a transceiver, or an input/output interface of a communication chip or a system-on-chip. The above processing unit may be one or more processors.

It should be understood that the network device 400 according to the embodiment of the present disclosure may correspond to the network device in the method embodiment of the present disclosure, and the above and other operations and/or functions of the respective units in the network device 400 are provided for the purpose of implementing the process flow corresponding to the network device in the method 200 shown in FIG. 2, and details thereof will be not omitted here for brevity.

Figure 5:
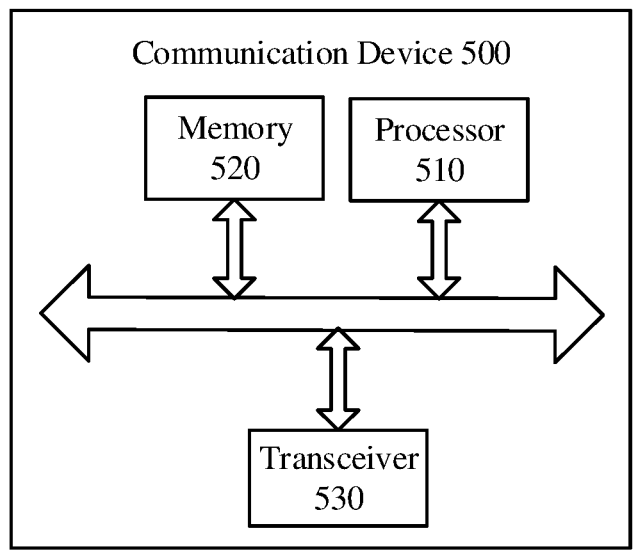
FIG. 5 is a schematic block diagram of a communication device according to an embodiment of the present disclosure.

FIG. 5 is a schematic diagram showing a structure of a communication device 500 according to an embodiment of the present disclosure. The communication device 500 shown in FIG. 5 includes a processor 510, and the processor 510 can invoke and execute a computer program from a memory to implement the method in the embodiment of the present disclosure.

Optionally, as shown in FIG. 5, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, as shown in FIG. 5, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 530 may further include one or more antennas.

Optionally, the communication device 500 may specifically be the network device according to the embodiment of the present disclosure, and the communication device 500 may implement the corresponding processes implemented by the network device in any of the methods according to the embodiments of the present disclosure. For the sake of brevity, details thereof will be omitted here.

Optionally, the communication device 500 may specifically be the mobile terminal/terminal device according to the embodiment of the present disclosure, and the communication device 500 may implement the corresponding processes implemented by the mobile terminal/terminal device in any of the methods according to the embodiments of the present disclosure. For the sake of brevity, details thereof will be omitted here.

Figure 6:
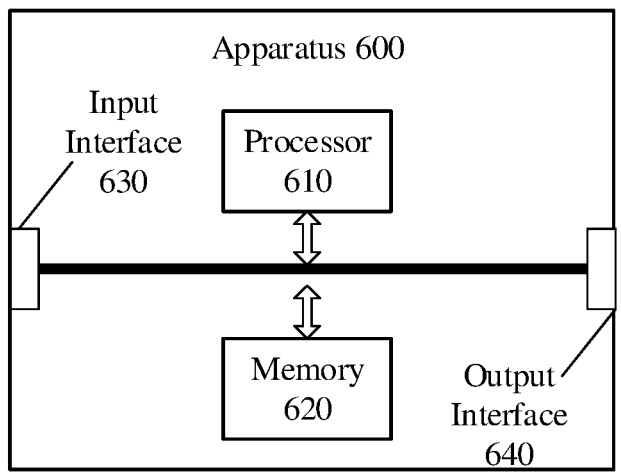
FIG. 6 is a schematic block diagram of an apparatus according to an embodiment of the present disclosure.

FIG. 6 is a schematic diagram showing a structure of an apparatus according to an embodiment of the present disclosure. The apparatus 600 shown in FIG. 6 includes a processor 610, and the processor 610 can invoke and execute a computer program from a memory to implement the method in the embodiment of the present disclosure.

Optionally, as shown in FIG. 6, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the mobile terminal/terminal device in the embodiment of the present disclosure, and the apparatus can implement the corresponding processes implemented by the mobile terminal/terminal device in the various methods of the embodiments of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

Figure 7:
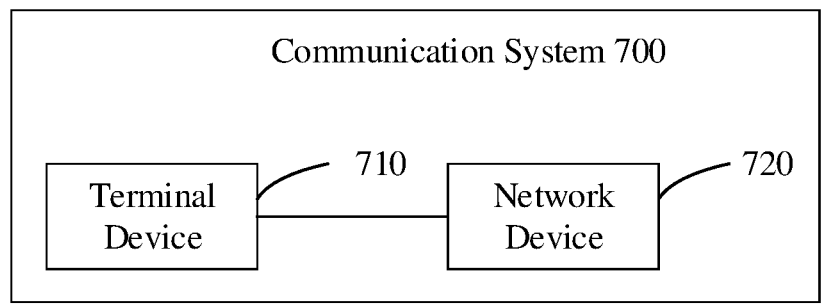
FIG. 7 is a schematic block diagram of a communication system according to an embodiment of the present disclosure.

FIG. 7 is a schematic block diagram showing a communication system 700 according to an embodiment of the present disclosure. As shown in FIG. 7, the communication system 700 includes a terminal device 710 and a network device 720.

Here, the terminal device 710 can be configured to implement the corresponding functions implemented by the terminal device in the above method, and the network device 720 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A method for sending a Sounding Reference Signal (SRS), comprising:
   determining, by a terminal device, a first Timing Advance (TA) based on a second TA and a TA timer; and
   transmitting, by the terminal device, the SRS according to the first TA,
   wherein the terminal device is in an inactive state, the second TA is a TA before the terminal device leaves a connected state, and the TA timer has one starting or restarting condition comprising: the terminal device entering the inactive state.

2. The method according to claim 1, wherein the TA timer has one or more stopping conditions comprising:
   the terminal device moving from a current cell to another cell.

3. The method according to claim 1, further comprising:
   receiving, by the terminal device, configuration information for configuring the TA timer.

4. The method according to claim 3, wherein:
   the configuration information is carried in Radio Resource Control (RRC) release information.

5. The method according to claim 1, further comprising:
   stopping, by the terminal device, transmission of the SRS, when the TA timer expires.

6. A method for receiving a Sounding Reference Signal (SRS), comprising:
   receiving, by a network device, the SRS transmitted by a terminal device according to a first Timing Advance (TA), wherein the terminal device is in an inactive state, the first TA is determined based on a second TA and a TA timer, wherein the second TA is a TA before the terminal device leaves a connected state, and the TA timer has one starting or restarting condition comprising: the terminal device entering the inactive state.

7. The method according to claim 6, wherein the TA timer has one or more stopping conditions comprising:
   the terminal device moving from a current cell to another cell.

8. The method according to claim 6, further comprising:
   transmitting, by the network device, configuration information to the terminal device for configuring the TA timer.

9. The method according to claim 8, wherein
   the configuration information is carried in Radio Resource Control (RRC) release information.

10. A terminal device, comprising: a processor and a memory, wherein the memory has a computer program stored thereon, and the processor is configured to invoke and execute the computer program stored in the memory to:
   determine a first Timing Advance (TA) based on a second TA and a TA timer; and
   transmit a Sounding Reference Signal (SRS) according to the first TA,
   wherein the terminal device is in an inactive state, the second TA is a TA before the terminal device leaves a connected state, and the TA timer has one starting or restarting condition comprising: the terminal device entering the inactive state.

11. The terminal device according to claim 10, wherein the TA timer has one or more stopping conditions comprising:
   the terminal device moving from a current cell to another cell.

12. A network device, comprising: a processor and a memory, wherein the memory has a computer program stored thereon, and the processor is configured to invoke and execute the computer program stored in the memory to perform the method according to claim 6.

13. A non-transitory computer-readable storage medium, storing a computer program that causes a computer to perform the method according to claim 1.

14. A non-transitory computer-readable storage medium, storing a computer program that causes a computer to perform the method according to claim 6.

* * * * *